United States Patent
Mikolichek et al.

(10) Patent No.: US 8,806,956 B2
(45) Date of Patent: Aug. 19, 2014

(54) FASTENING SYSTEM FOR MAGNETIC FLOWMETER LINER

(75) Inventors: Michael Mikolichek, Farmington, MN (US); Steven Bruce Rogers, Minnetonka, MN (US)

(73) Assignee: Rosemount Inc., Bloomington, MN (US)

( * ) Notice: Subject to any disclaimer, the term of this patent is extended or adjusted under 35 U.S.C. 154(b) by 177 days.

(21) Appl. No.: 13/472,685

(22) Filed: May 16, 2012

(65) Prior Publication Data

US 2013/0305838 A1    Nov. 21, 2013

(51) Int. Cl.
*G01F 1/56* (2006.01)

(52) U.S. Cl.
USPC ........................................ 73/861.08

(58) Field of Classification Search
USPC ........................ 73/861.12, 861.08
See application file for complete search history.

(56) References Cited

U.S. PATENT DOCUMENTS

| | | |
|---|---|---|
| 5,115,724 A | 5/1992 | Zavoda |
| 5,385,055 A | 1/1995 | Kubota et al. |
| 5,773,723 A * | 6/1998 | Lewis et al. ............... 73/861.12 |
| 7,552,651 B2 * | 6/2009 | Kaneko ..................... 73/861.12 |
| 7,637,169 B2 * | 12/2009 | Shanahan et al. .......... 73/861.08 |
| 2007/0193366 A1 | 8/2007 | Backer et al. |
| 2009/0188327 A1 | 7/2009 | Shanahan et al. |
| 2011/0314931 A1 | 12/2011 | Iijima et al. |

FOREIGN PATENT DOCUMENTS

WO    93-09403 A1    5/1993

OTHER PUBLICATIONS

International Search Report and Written Opinion, mailed Sep. 24, 2013.

\* cited by examiner

*Primary Examiner* — Jewel V Thompson
(74) *Attorney, Agent, or Firm* — Kinney & Lange, P.A.

(57) ABSTRACT

A magnetic flowmeter sensor includes two sensor faces, a conduit, a liner lining the conduit, and mechanical fasteners. The sensor faces are on each end of the sensor for connecting the sensor to the process fluid flow. The conduit connects the two sensor faces for conducting the process fluid flow through the sensor. The liner extends across at least a portion of each sensor face at each end of the flowmeter sensor to form a planar sealing surface on each end of the sensor. The liner includes holes through which the mechanical fasteners pass to mechanically attach the liner to the flowmeter sensor to prevent shifting of the liner. The mechanical fasteners do not extend beyond the planar sealing surfaces.

25 Claims, 7 Drawing Sheets

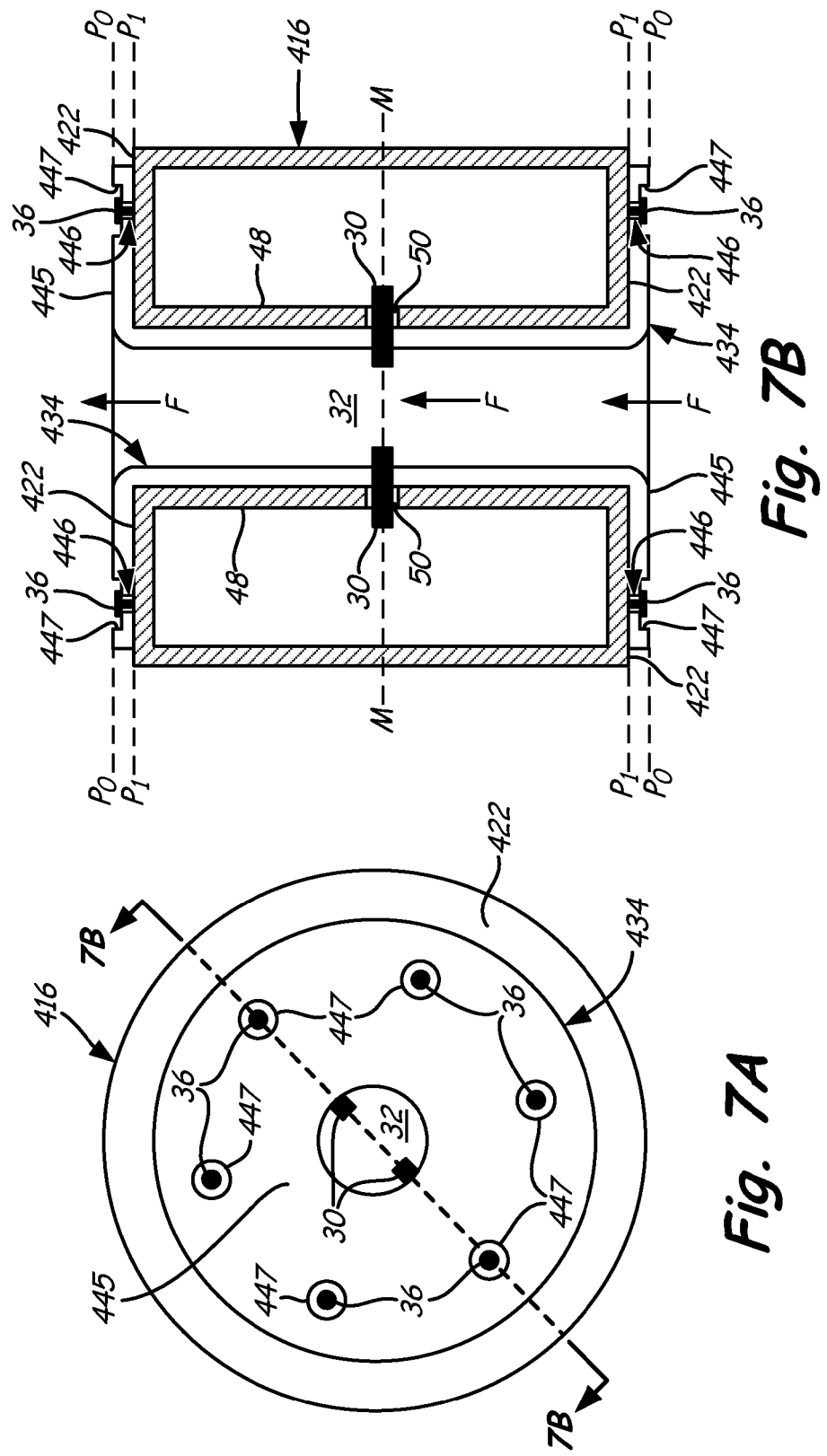

FASTENING SYSTEM FOR MAGNETIC FLOWMETER LINER

BACKGROUND

The present invention relates generally to industrial magnetic flowmeters for process measurement and control. Specifically, the invention concerns a magnetic flowmeter sensor having a liner.

A magnetic flowmeter determines a flow rate of a conductive fluid flowing through a conduit in a flowmeter sensor portion of the flowmeter. The magnetic flowmeter measures a voltage generated across the fluid in a direction perpendicular to the fluid flow as the fluid moves through a magnetic field generated within the flowmeter sensor. The voltage is measured between two electrodes in contact with the fluid and positioned on opposite sides of the conduit. The conduit walls must be electrically non-conductive or, if conductive, have an electrically non-conductive liner to keep from shorting out the voltage generated across the fluid flow. If the conduit wall is conductive, the two electrodes must also be electrically insulated from the conduit wall and must penetrate the non-conductive liner to accurately measure the generated voltage.

Polytetrafluoroethylene (PTFE) is a common material choice for a liner in a magnetic flowmeter due to its durability and exceptional resistance to chemical attack. A PTFE liner is fitted to a magnetic flowmeter sensor by inserting a cylindrical PTFE liner into the conduit of the flowmeter sensor, heating the liner, and flaring the liner out at opposite ends of the conduit on to sealing surfaces of the sensor faces. The sensor faces are where the magnetic flowmeter connects into process piping carrying the flow to be measured. However, the flaring process does not leave the liner lying flat against the sealing surfaces. The elastic nature of the PTFE causes the flared liner to spring back, away from the sealing surfaces, leaving a gap between the flared liner and the sealing surfaces. Once installed this gap is closed up by the clamping load of flange bolts connecting the sealing surfaces of the magnetic flowmeter to flanges on the process piping. However, before the flowmeter installation is complete and during the process of handling and installing the magnetic flowmeter, the liner is susceptible to shifting if not handled and installed correctly. Any shifting of the liner can shift the electrodes penetrating the liner and lead to process fluid leaking around the electrodes or result in electrodes shorting against the conduit walls.

One solution to this problem has been to employ adhesives to secure the flared liner to the sealing surfaces. This requires the use of special chemicals capable of overcoming the inherent resistance of PTFE to chemical attack, in order to create a surface suitable for adhesive bonding. Unfortunately, these special chemicals are often hazardous to people, the environment, or both.

Another solution avoids the dangers of the hazardous chemicals by not bonding the liner to the sealing surfaces at all, but relying on clear, specific, and detailed instructions in the proper handling and installation of the magnetic flowmeter. Unfortunately, this solution relies on those who handle and install the magnetic flowmeter to follow such instructions. No matter how excellent the instructions are, it is unlikely that they will be followed in all cases. Thus, a solution is desired that prevents liner shifting in all cases and does not employ chemicals hazardous to people or the environment.

SUMMARY

An embodiment of the present invention is a magnetic flowmeter sensor for detecting a flow rate of a process fluid flow. The flowmeter sensor includes two sensor faces, a conduit, a liner lining the conduit, and mechanical fasteners. The sensor faces are on each end of the flowmeter sensor for connecting the flowmeter sensor to the process fluid flow. The conduit connects the two sensor faces for conducting the process fluid flow through the sensor. The liner lining the conduit prevents physical contact between the process fluid flow and the conduit. The liner extends the full length of the conduit and extends across at least a portion of each sensor face at each end of the flowmeter sensor to form a planar sealing surface on each end of the sensor. The liner includes holes through which the mechanical fasteners pass to mechanically attach the liner to the flowmeter sensor to prevent shifting of the liner. The mechanical fasteners do not extend beyond the planar sealing surfaces.

BRIEF DESCRIPTION OF THE DRAWINGS

FIGS. 7A-7B are illustrations of another embodiment of the magnetic flowmeter sensor of FIG. 5.

DETAILED DESCRIPTION

The present invention is a magnetic flowmeter sensor and system including a conduit liner secured against shifting during the process of handling and installing the magnetic flowmeter. In contrast to the prior art, the present invention does not employ hazardous chemicals and adhesives to secure the liner, nor does the present invention rely on those who handle and install the magnetic flowmeter to correctly follow instructions designed to prevent liner shifting.

The present invention prevents liner shifting by employing mechanical fasteners to secure the liner to the flowmeter sensor. Importantly, the mechanical fasteners are attached such that no portion of the mechanical fasteners extends beyond the planar sealing surfaces on each end of the flowmeter sensor. Thus, the mechanical fasteners do not interfere with the effective sealing between the flowmeter sensor and pipe flanges carrying the process fluid.

Figure 1:
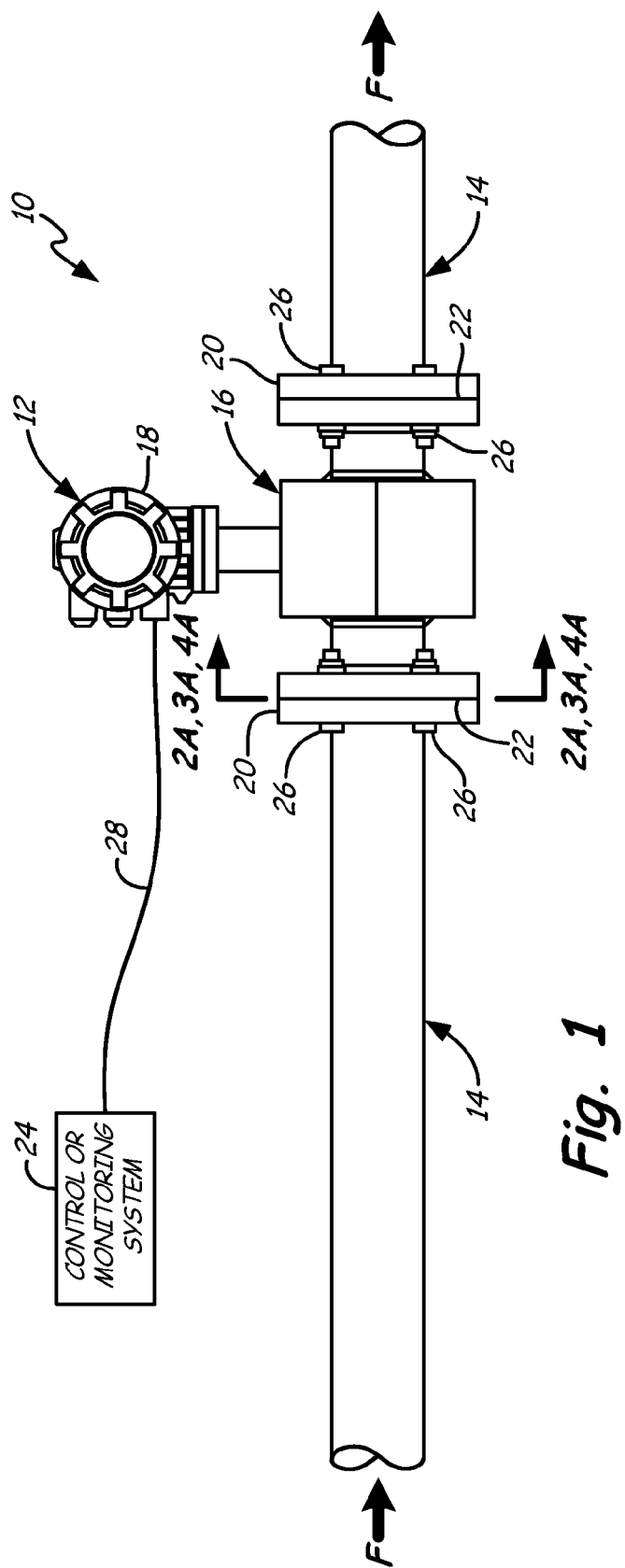
FIG. 1 is a representative diagram of a magnetic flowmeter system including an embodiment of a flange-type magnetic flowmeter sensor of the present invention for measuring a flow rate of a process fluid flow and transmitting the measured flow rate to a control or monitoring system.

FIG. 1 is a representative diagram of a magnetic flowmeter system including an embodiment of a magnetic flowmeter sensor of the present invention for measuring a flow rate of a process fluid flow and transmitting the measured flow rate to a control or monitoring system. FIG. 1 shows process measurement or control point 10, including magnetic flowmeter system 12, and process piping 14. Magnetic flowmeter system 12 includes magnetic flowmeter sensor 16, and process transmitter 18. Magnetic flowmeter sensor 16 includes two sensor faces 22 at opposite ends of magnetic flowmeter sensor 16. In the embodiment of FIG. 1, sensor faces 22 are flange-type faces. Process piping 14 includes pipe flanges 20. Also shown in FIG. 1 is control or monitoring system 24. Process piping 14 contains a flow of process fluid F. Process fluid F is electrically conductive. Magnetic flowmeter system 12 is inserted between sections of process piping 14, and sensor faces 22 are each connected by flange bolts 26 to pipe flanges 20 such that the flow of process fluid F passes through magnetic flowmeter sensor 16. Process transmitter 18 is connected to control or monitoring system 24 by communications means 28. Communications means 28 is, for example, a two-wire 4-20 mA control loop.

Figure 2:
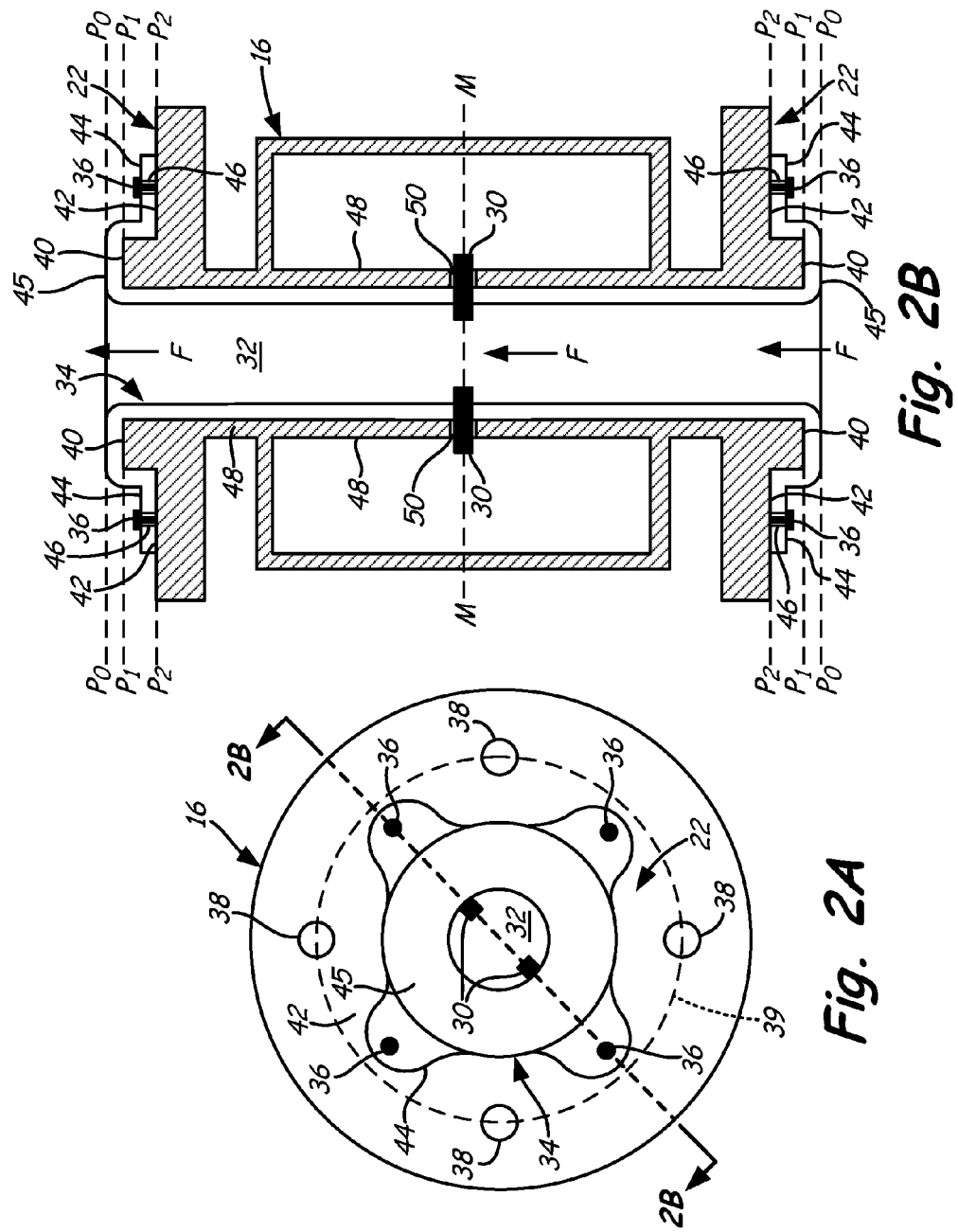
FIGS. 2A-2B are illustrations of an embodiment of the magnetic flowmeter sensor of FIG. 1.

In operation, a magnetic field is generated by magnetic flowmeter sensor 16 in a direction perpendicular to the direction of the flow of process fluid F. The magnetic field induces a voltage across the flow of process fluid F in a direction perpendicular to both the flow of process fluid F and the direction of the magnetic field. The magnitude of the induced voltage is proportional to the velocity of process fluid F through magnetic flowmeter sensor 16. The induced voltage is detected by electrodes 30 (as shown in FIGS. 2A and 2B) producing a voltage signal. The voltage signal is conducted to process transmitter 18 where process transmitter 18 converts the detected voltage into a flow rate measurement and transmits the flow rate measurement to control or monitoring system 24 over communications means 28.

FIGS. 2A-2B are illustrations of an embodiment of magnetic flowmeter sensor 16 of FIG. 1. FIG. 2A is an end view of the embodiment of magnetic flowmeter sensor 16. As shown in FIG. 2A, magnetic flowmeter sensor 16 includes sensor face 22, electrodes 30, conduit 32, liner 34, mechanical fasteners 36, and bolt holes 38. Sensor face 22 includes first face portion 40 (shown in FIG. 2B) and second face portion 42. As noted above, in this embodiment sensor face 22 is a flange-type face. Bolt holes 38 are arranged in a circle, bolt hole circle 39, with adjacent bolt holes 38 being those next to each other on bolt hole circle 39. Bolt holes 38 accommodate flange bolts 26 in connecting magnetic flowmeter sensor 16 to pipe flanges 20 of process piping 14 as described above in reference to FIG. 1. Liner 34 includes liner extension 44 which is a portion of liner 34 that extends beyond first face portion 40 to second face portion 42. Liner 34 also includes planar sealing surface 45 described below in reference to FIG. 2B.

As illustrated in FIG. 2A, liner extension 44 extends as multiple portions or tabs with one tab between each pair of adjacent bolt holes 38. The use of tabs prevents liner extension 44 from interfering with the operation of flange bolts 26 in bolt holes 38. However, it is understood that in the present invention, liner extension 44 may also be a complete, circular extension of liner 34 without tabs, providing that it does not interfere with the operation of flange bolts 26 in bolt holes 38. It is also understood that the present invention includes embodiments where multiple tabs of liner extension 44 extend between each pair of adjacent bolt holes 38, as well as embodiments where not all pairs of adjacent bolt holes 38 have a tab of liner extension 44 extending between them.

FIG. 2B is a cross-section of magnetic flowmeter sensor 16 of FIG. 2A. FIG. 2B shows that magnetic flowmeter sensor 16 includes metal conduit walls 48 extending between sensor faces 22, with conduit walls 48 defining conduit 32. As shown in FIG. 2B, liner 34 lines conduit 32 and extends beyond conduit 32 on to sensor faces 22 at each end of magnetic flowmeter sensor 16. As noted above, at each sensor face 22, liner 34 extends across first face portion 40 with liner extension 44 extending beyond first face portion 40 to second face portion 42. Where liner 34 extends across first face portion 40, planar sealing surface 45 is formed defining sealing plane P0 on each end of flowmeter sensor 16. Planar sealing surface 45 is a surface of flowmeter sensor 16 that, once installed, physically connects and seals conduit 32 to pipe flange 20 of processing piping 14. Thus, it is essential that nothing extends beyond planar sealing surface 45 that might interfere with the physical connection and sealing of flowmeter sensor 16 to pipe flange 20.

As illustrated in FIG. 2B, liner 34 also includes a plurality of holes 46. Holes 46 are openings in liner extension 44 through which mechanical fasteners 36 pass to secure liner 34 to second face portion 42. As shown in FIG. 2B, this embodiment employs a raised-flange-type connection, in which first face portion 40 is contained within first plane P1 and second face portion 42 is contained within second plane P2. Considering FIGS. 2A and 2B together, bolt holes 38 intersect sensor face 22 at second plane P2. Both first plane P1 and second plane P2 are perpendicular to an axis defined by conduit 32. First plane P1 is axially further from mid-point M between sensor faces 22 than second plane P2. In the present embodiment, by securing liner 34 to second face portion 42, mechanical fasteners 36 may extend beyond liner 34, but will not extend beyond planar sealing surface 45 at plane P0. Although the embodiment illustrated in FIGS. 2A and 2B shows one mechanical fastener 36 and one hole 46 for each portion of liner extension 44 extending between adjacent bolt holes 38, it is understood that the present invention includes embodiments including a plurality of mechanical fasteners 36 and a plurality of holes 46 for each portion of liner extension 44 extending between adjacent bolt holes 38.

Preferably, mechanical fasteners 36 are roughly T-shaped with a bottom portion attached to second face portion 42 and a top portion wider than a diameter of holes 46 such that liner extension 44 is held in position against second face portion 42. The top portion may be flat against liner extension 44 as shown in FIG. 2B or may be countersunk to help achieve the requirement that no portion of mechanical fasteners 36 extends beyond planar sealing surface 45, as shown below in reference to FIG. 4B. Examples of mechanical fasteners 36 attached by welding include headed weld studs (weld studs with a nail head top) and shear connector weld studs. The holding capability of either of these weld studs can be enhanced by including a washer between the T-shaped top portion and liner extension 44, with the T-shaped top portion holding the washer down and the larger surface area of the washer holding liner extension 44 down.

In operation, as process fluid F flows through conduit 32, a magnetic field is generated by magnetic coils (not shown) in magnetic flowmeter sensor 16 in a direction perpendicular to conduit 32 and perpendicular to a line between electrodes 30. The magnetic field induces a voltage in process fluid F proportional to the velocity of process fluid F which is detected by electrodes 30, producing a voltage signal. Electrical wires (not shown) connected to electrodes 30 conduct the voltage signal to process transmitter 18 as discussed above in reference to FIG. 1. Electrodes 30 penetrate both conduit walls 48 and liner 34. Because conduit walls 48 are conductive, insulators 50 are required between electrodes 30 and conduit walls 48. Liner 34 fits snugly around electrodes 30, thus any shifting of liner 34 before or during installation of magnetic flowmeter sensor 16 would shift electrodes 30. Once installed and in operation, this shifting of electrodes 30 may result in process fluid F leaking around electrodes 30 or resulting in electrodes 30 damaging insulators 50 or moving relative to insulators 50 and shorting against conduit walls 48. However, in the present invention, mechanical fasteners 36 secure liner 34 to second face portion 42 preventing shifting of liner 34 before and during installation of magnetic flowmeter 16. Importantly, because mechanical fasteners 36 are attached to second face portion 42, they do not interfere with the sealing of magnetic flowmeter sensor 16 against pipe flanges 20, provided that no portion of mechanical fasteners 36 extends beyond planar sealing surface 45.

Figure 3:
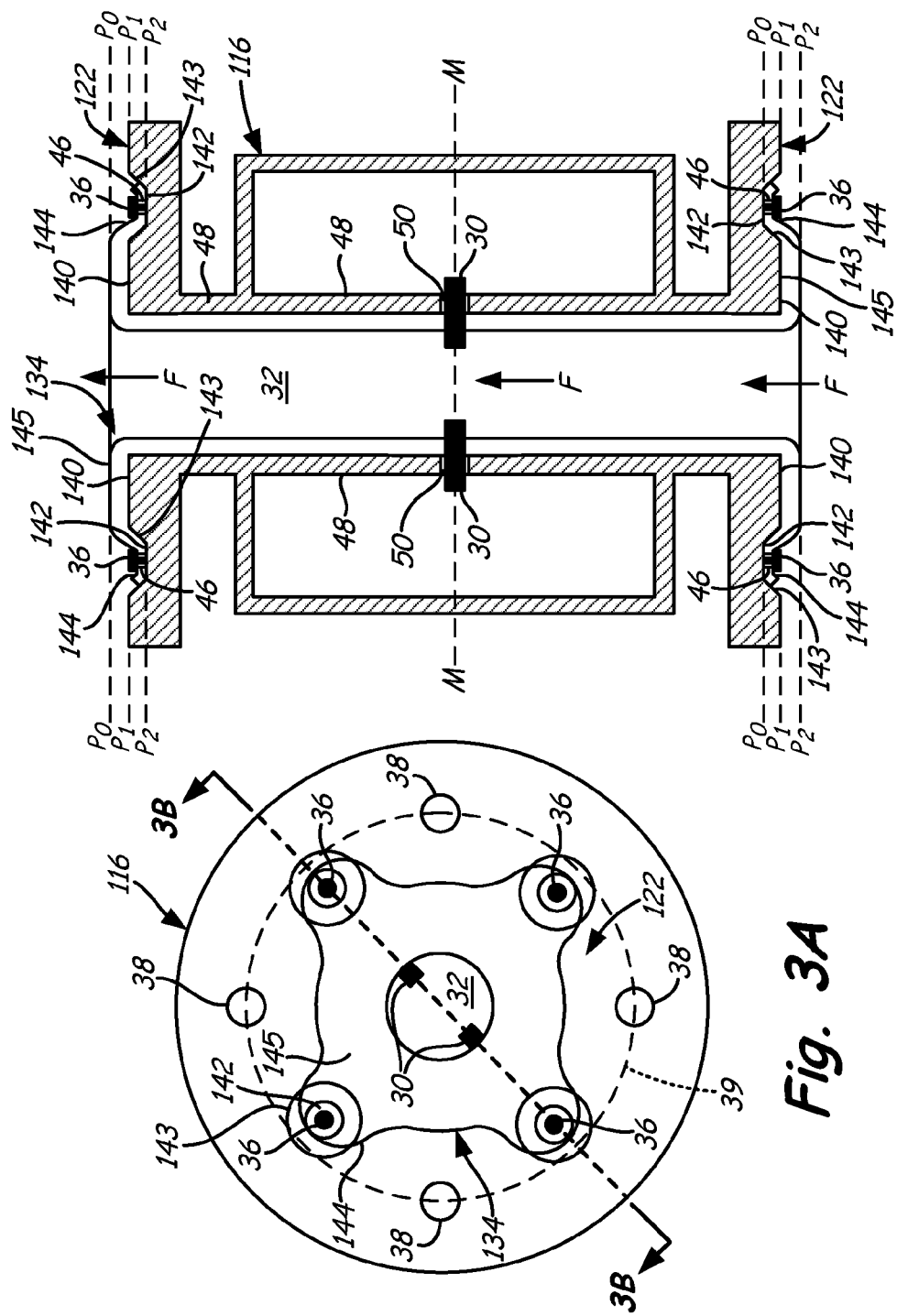
FIGS. 3A-3B are illustrations of another embodiment of the magnetic flowmeter sensor of FIG. 1.

FIGS. 3A-3B illustrate another embodiment of the magnetic flowmeter sensor of FIG. 1. In contrast to the raised-flange-type connection illustrated in the embodiment shown in FIGS. 2A and 2B, this embodiment employs a flat-flange-type connection. The embodiment of FIGS. 3A-3B is identical to the embodiment shown in FIGS. 2A-2B, except as described below. All identically numbered components are as described above in reference to FIGS. 1, 2A, and 2B. FIG. 3A is an end view of magnetic flowmeter sensor 116. FIG. 3B is a cross-section of magnetic flowmeter sensor 116 shown in FIG. 3A. Considering FIGS. 3A and 3B together, magnetic flowmeter sensor 116 is identical to magnetic flowmeter sensor 16, except for sensor faces 122 and liner 134. Sensor face 122 includes first face portion 140, second face portion 142, and recess 143. Liner 134 includes liner extension 144 which is a portion of liner 134 that extends beyond first face portion 140. Liner 134 also includes planar sealing surface 145 formed where liner 134 extends across first face portion 140, thus defining sealing plane P0 on each end of flowmeter sensor 116. Planar sealing surface 145 is a surface of flowmeter sensor 116 that, once installed, physically connects and seals conduit 32 to pipe flange 20 of processing piping 14. Thus, it is essential that nothing extends beyond planar sealing surface 145 that might interfere with the physical connection and sealing of flowmeter sensor 116 to pipe flange 20.

As noted above, and shown in FIGS. 3A and 3B, this embodiment employs a flat-flange-type connection, in which first face portion 140 is contained within first plane P1 and second face portion 142 is contained within second plane P2. Bolt holes 38 intersect sensor face 122 at first plane P1. First plane P1 is axially further from mid-point M between sensor faces 122 than second plane P2. Second face portion 142 is at the bottom of recess 143 in sensor face 122, recess 143 being preferably frustoconical in shape, as illustrated. Alternatively, other shapes for recess 143 may be employed, for example cylindrical or hemispherical. Liner 134 lines conduit 32 and extends beyond conduit 32 on to sensor faces 122 at each end of magnetic flowmeter sensor 116. At each sensor face 122, liner 134 extends across first face portion 140 and liner extension 144 extends into recess 143 and on to second face portion 142 at the bottom of recess 143. Thus, by securing liner 134 to sensor face 122 at second face portion 142, mechanical fasteners 36 may extend beyond liner 134, but will not extend beyond planar sealing surface 145 at plane P0.

Operation of the embodiment of FIGS. 3A-3B, as well as the nature of mechanical fasteners 36 including attachment means, is identical to the embodiment of FIGS. 2A-2B described above. Mechanical fasteners 36 secure liner 134 to second face portion 142 preventing shifting of liner 134 before and during installation of magnetic flowmeter 116. Importantly, mechanical fasteners 36 do not interfere with the sealing of magnetic flowmeter sensor 116 against pipe flanges 20 because no portion of mechanical fasteners 36 extends beyond planar sealing surface 145 at plane P0.

Figure 4:
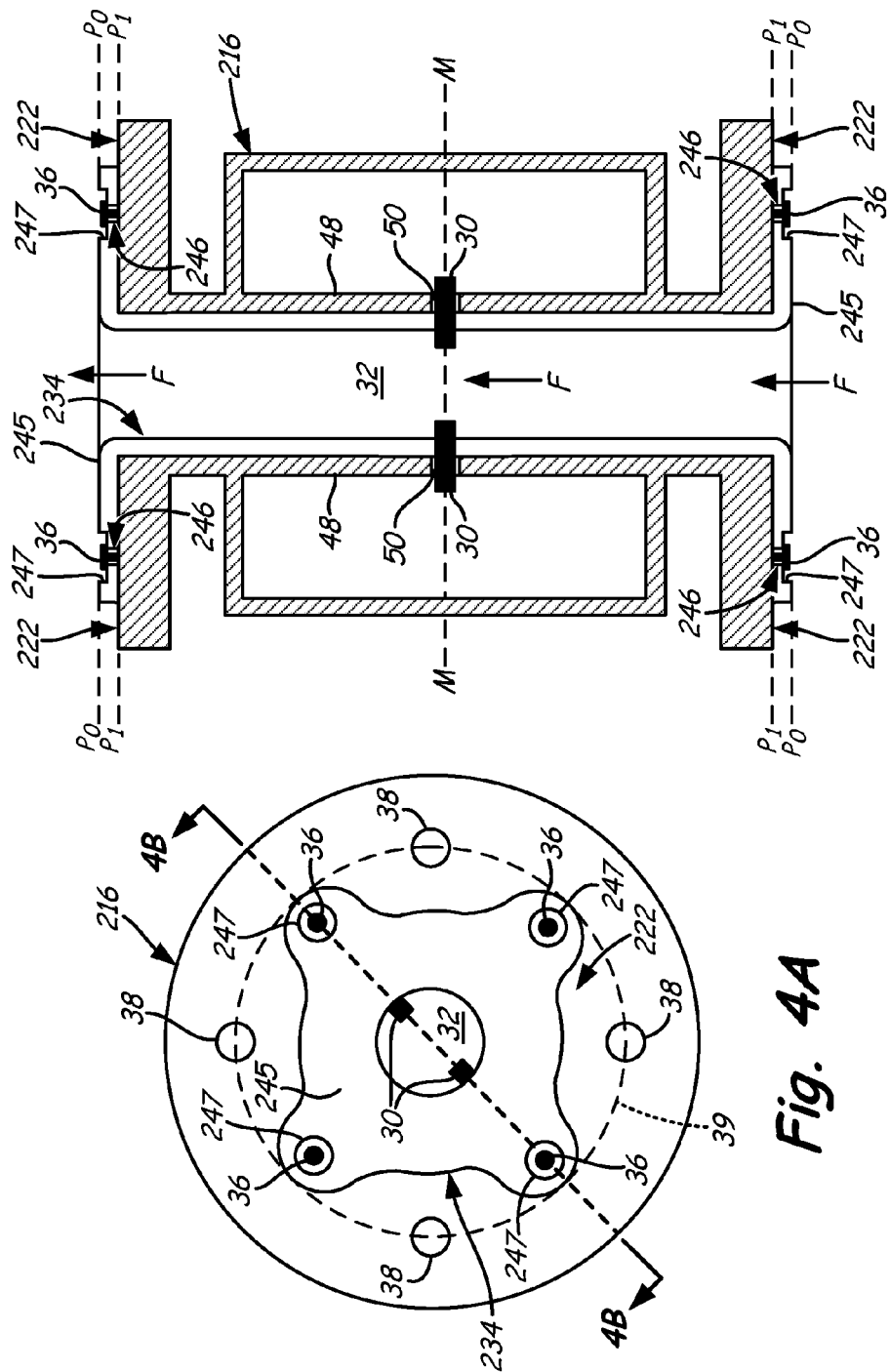
FIGS. 4A-4B are illustrations of another embodiment of the magnetic flowmeter sensor of FIG. 1.

FIGS. 4A-4B illustrate another embodiment of the magnetic flowmeter sensor of FIG. 1. Like the embodiment shown in FIGS. 3A-3B, the embodiment of FIGS. 4A-4B is also a flat-flange-type connection. The embodiment shown in FIGS. 4A-4B is identical to the embodiment shown in FIGS. 2A-2B, except as described below. All identically numbered components are as described above in reference to FIGS. 1, 2A, and 2B. FIG. 4A is an end view of magnetic flowmeter sensor 216. FIG. 4B is a cross-section of magnetic flowmeter sensor 216 of FIG. 4A. Considering FIGS. 4A and 4B together, magnetic flowmeter sensor 216 is identical to magnetic flowmeter sensor 16, except for sensor faces 222 and liner 234. Liner 234 extends across a portion of sensor face 222. Liner 234 includes planar sealing surface 245 formed where liner 234 extends across sensor face 222, thus defining sealing plane P0 on each end of flowmeter sensor 216. Liner 234 also includes holes 246. Planar sealing surface 245 is a surface of flowmeter sensor 216 that, once installed, physically connects and seals conduit 32 to pipe flange 20 of processing piping 14. Thus, it is essential that nothing extends beyond planar sealing surface 245 that might interfere with the physical connection and sealing of flowmeter sensor 216 to pipe flange 20.

As shown in FIGS. 4A and 4B, sensor face 222 is contained within first plane P1 and bolt holes 38 intersect sensor face 222 at first plane P1. Unlike holes 46 shown in FIGS. 2A-3B, each of holes 246 includes recess 247 at planar sealing surface 245. Recess 247 is sized to accommodate the wider top portion of mechanical fastener 36 (optionally including a washer, as described above), but does not extend through the full depth of liner 234. Thus, recess 247 has a greater cross-sectional area in a direction parallel to planar sealing surface 245 than the rest of hole 246 closer to sensor face 222. Once the bottom portion of mechanical fastener 36 is attached to sensor face 222, liner 234 is held in position against sensor face 222 because the top portion of mechanical fastener 36 is wider than the diameter of hole 246 between recess 247 and sensor face 222. Preferably, recess 247 is cylindrical in shape, as illustrated in FIG. 4B. Alternatively, other shapes for recess 247 may be employed, for example, frustoconical or hemispherical. In this embodiment, the top portion of mechanical fastener 36 is countersunk in liner 234 below plane P0 such that no portion of mechanical fastener 36 extends beyond planar sealing surface 245.

Figure 5:
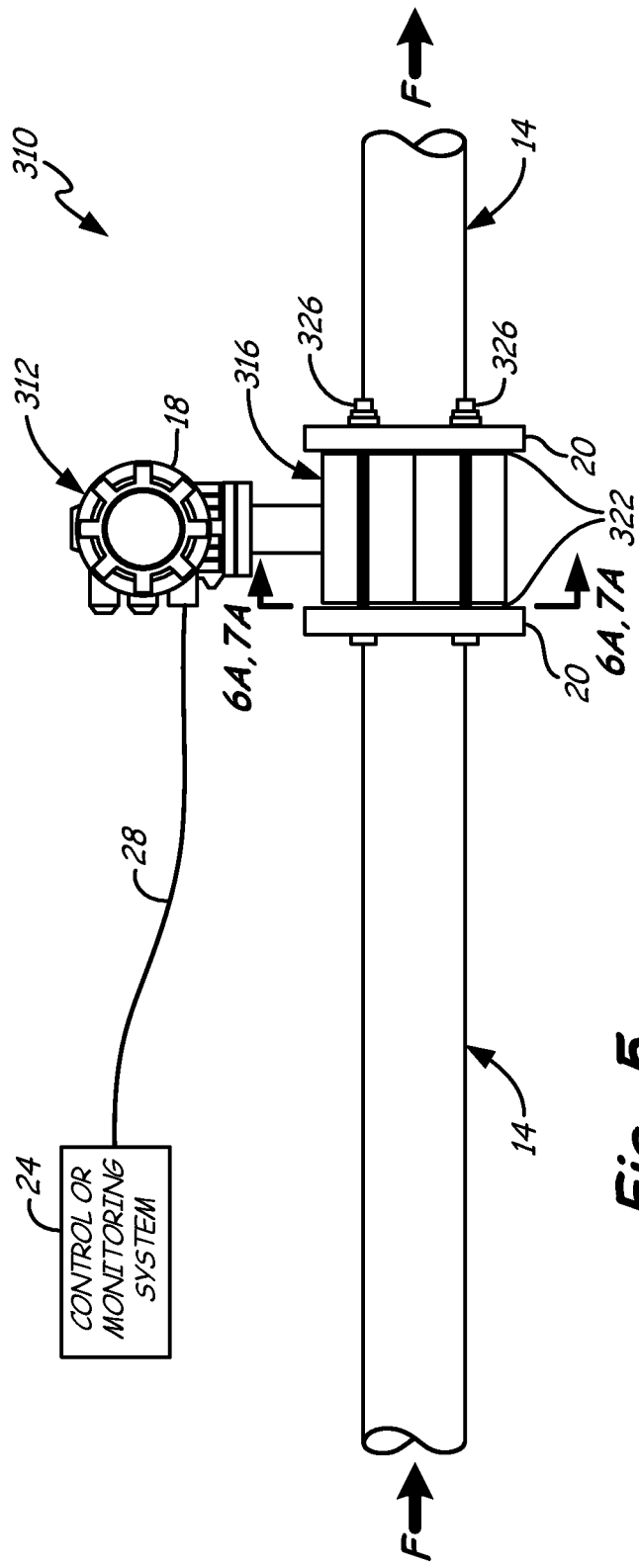
FIG. 5 is a representative diagram of another magnetic flowmeter system including an embodiment of a wafer-type magnetic flowmeter sensor of the present invention for measuring a flow rate of a process fluid flow and transmitting the measured flow rate to a control or monitoring system.

FIG. 5 is a representative diagram of another magnetic flowmeter system including an embodiment of a magnetic flowmeter sensor of the present invention for measuring a flow rate of a process fluid flow and transmitting the measured flow rate to a control or monitoring system. In the embodiments of FIGS. 1, 2A-2B, 3A-3B, and 4A-4B, the magnetic flowmeter sensor is a flange-type sensor. In the embodiments of FIGS. 5, 6A-6B, and 7A-7B, the magnetic flowmeter sensor is a wafer-type sensor. All identically numbered components are as described above in reference to FIGS. 1, 2A-2B, 3A-3B, and 4A-4B. FIG. 5 shows process measurement or control point 310, including magnetic flowmeter system 312, and process piping 314. Magnetic flowmeter system 312 includes magnetic flowmeter sensor 316, and process transmitter 18. Magnetic flowmeter sensor 316 includes two sensor faces 322 at opposite ends of magnetic flowmeter sensor 316. In the embodiment of FIG. 5, sensor faces 322 are wafer-type faces. Magnetic flowmeter system 312 is inserted between sections of process piping 14, and sensor faces 322 are each secured to pipe flanges 20 by flange bolts 326 such that the flow of process fluid F passes through magnetic flowmeter sensor 316. Flange bolts 326 are much longer than flange bolts 26 because in mounting a wafer-type sensor, flange bolts 326 extend the full length of magnetic flowmeter sensor 316 and are secured between each pipe flange 20. Operation of the embodiment of FIG. 5 is identical to that of the embodiment of FIG. 1 described above.

Figures 6A, 6B:
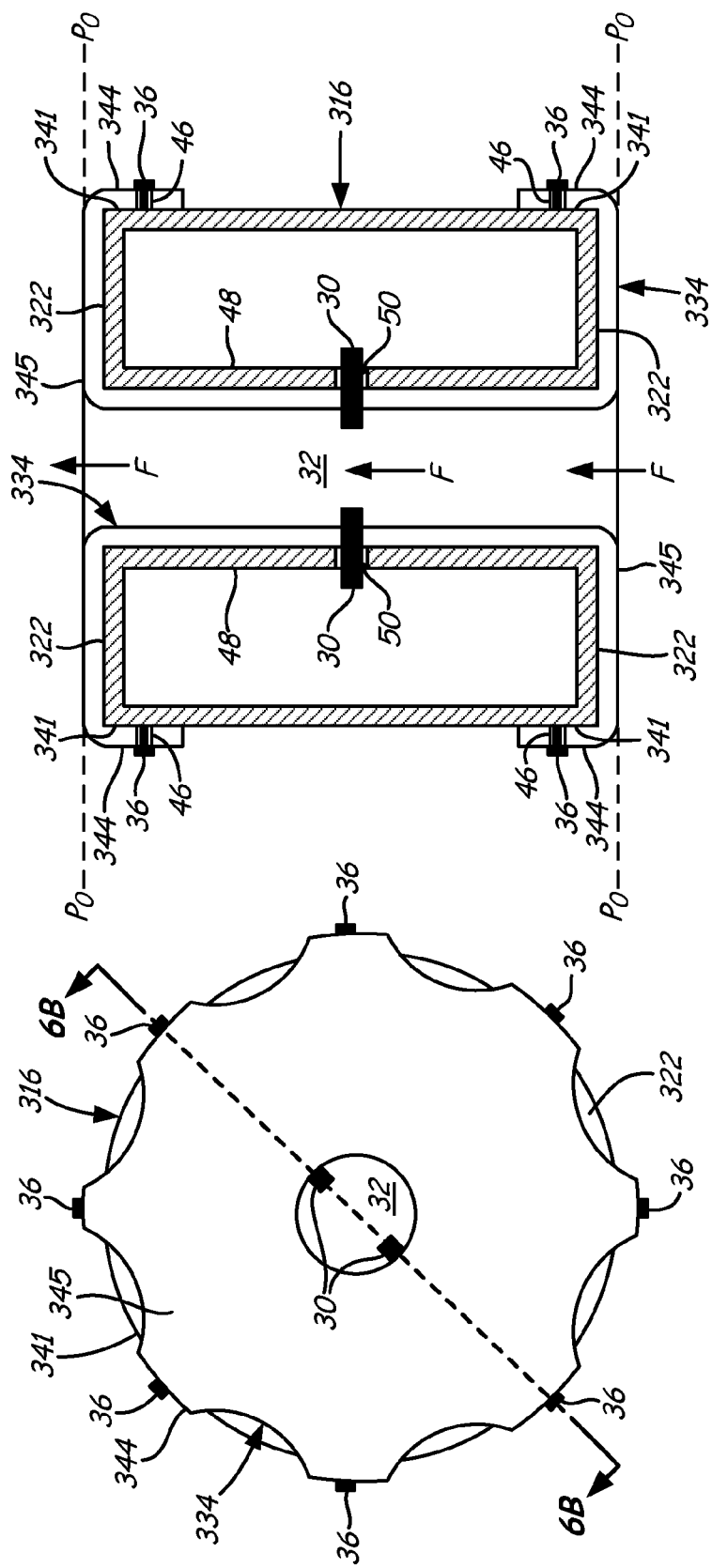
FIGS. 6A-6B are illustrations of an embodiment of the magnetic flowmeter sensor of FIG. 5.

FIGS. 6A-6B are illustrations of an embodiment of the magnetic flowmeter sensor 316 of FIG. 5. FIG. 6A is an end view of magnetic flowmeter sensor 316. All identically numbered components are as described above. As shown in FIG.

6A, magnetic flowmeter sensor 316 includes sensor face 322, electrodes 30, conduit 32, liner 334, mechanical fasteners 36, and housing 341. Housing 341 is on the side of magnetic flowmeter sensor 316. As noted above, in this embodiment sensor faces 322 are wafer-type faces. Liner 334 includes liner extension 344 which is a portion of liner 334 that extends beyond sensor face 322. Liner 334 also includes planar sealing surface 345 described below in reference to FIG. 6B.

FIG. 6B is a cross-section of magnetic flowmeter sensor 316 of FIG. 6A. FIG. 6B shows that magnetic flowmeter sensor 316 further includes metal conduit walls 48 extending between sensor faces 322, conduit walls 48 defining conduit 32. As shown in FIG. 6B, liner 334 lines conduit 32 and extends beyond conduit 32 on to sensor faces 322 at each end of magnetic flowmeter sensor 316. Liner 334 also includes planar sealing surface 345, formed where liner 334 extends across sensor face 322, thus defining sealing plane P0 on each end of flowmeter sensor 316. Planar sealing surface 345 is a surface of flowmeter sensor 316 that, once installed, physically connects and seals conduit 32 to pipe flange 20 of processing piping 14. Thus, it is essential that nothing extends beyond planar sealing surface 345 that might interfere with the physical connection and sealing of flowmeter sensor 316 to pipe flange 20.

As noted above, at each sensor face 322, liner 334 extends across sensor face 322. As shown in FIG. 6B, liner extension 344 extends beyond sensor face 322 to housing 341. Liner 334 also includes a plurality of holes 46. Holes 46 are openings in liner extension 344 through which mechanical fasteners 36 pass to secure liner 334 to housing 341. As shown in FIGS. 6A and 6B, this embodiment employs a wafer-type connection, in which planar sealing surface 345 covers virtually all of sensor face 322, leaving little room for mechanical fasteners 36 to secure liner 334 to flowmeter sensor 316. By attaching mechanical fasteners 36 to housing 341 on the side of magnetic flowmeter sensor 316, liner 334 is secured to flowmeter sensor 316 preventing shifting of liner 334 before and during installation of flowmeter sensor 316. Importantly, because mechanical fasteners 36 are attached to housing 341 which is away from sensor face 322 and planar sealing surface 345, they do not interfere with the sealing of magnetic flowmeter sensor 316 against pipe flanges 20.

FIGS. 7A-7B illustrate another embodiment of the magnetic flowmeter sensor of FIG. 5. Like the embodiment shown in FIGS. 6A-6B, the embodiment of FIGS. 7A-7B is also a wafer-type flowmeter sensor. The embodiment shown in FIGS. 7A-7B is identical to the embodiment shown in FIGS. 6A-6B, except as described below. All identically numbered components are as described above. FIG. 7A is an end view of magnetic flowmeter sensor 416. FIG. 7B is a cross-section of magnetic flowmeter sensor 416 of FIG. 7A. Considering FIGS. 7A and 7B together, magnetic flowmeter sensor 416 is identical to magnetic flowmeter sensor 316, except for sensor faces 422 and liner 434. Liner 434 extends across a portion of sensor face 422. Liner 434 includes planar sealing surface 445 formed where liner 434 extends across sensor face 422, thus defining sealing plane P0 on each end of flowmeter sensor 416. Liner 434 also includes holes 446. Planar sealing surface 445 is a surface of flowmeter sensor 416 that, once installed, physically connects and seals conduit 32 to pipe flange 20 of processing piping 14. Thus, it is essential that nothing extends beyond planar sealing surface 445 that might interfere with the physical connection and sealing of flowmeter sensor 416 to pipe flange 20.

As shown in FIGS. 7A and 7B, sensor face 422 is contained within first plane P1. Unlike holes 46 shown in FIGS. 6A-6B, each of holes 446 includes recess 447 at planar sealing surface 445. Recess 447 is sized to accommodate the wider top portion of mechanical fastener 36 (optionally including a washer, as described above), but does not extend through the full depth of liner 434. Thus, recess 447 has a greater cross-sectional area in a direction parallel to planar sealing surface 445 than the rest of hole 446 closer to sensor face 422. Once the bottom portion of mechanical fastener 36 is attached to sensor face 422, liner 434 is held in position against sensor face 422 because the top portion of mechanical fastener 36 is wider than the diameter of hole 446 between recess 447 and sensor face 422. Preferably, recess 447 is cylindrical in shape, as illustrated in FIG. 7B. Alternatively, other shapes for recess 447 may be employed, for example, frustoconical or hemispherical. In this embodiment, the top portion of mechanical fastener 36 is countersunk in liner 434 below plane P0 such that no portion of mechanical fastener 36 extends beyond planar sealing surface 445.

A method of the present invention for preventing shifting of a liner lining a conduit of a magnetic flowmeter sensor while extending the liner across each of two sensor faces at opposite ends of the flowmeter sensor to create a planar sealing surface at each end of the flowmeter sensor is described in reference to FIGS. 2A and 2B, although the method applies to all embodiments. The method begins by inserting liner 34 into conduit 32 of flowmeter sensor 16. Initially, liner 34 is a cylindrical tube with holes 46 at each end. Once inserted, liner 34 is flared on to sensor faces 22. A mechanical fastener 36 is inserted into each of the plurality of holes 46 and the inserted mechanical fasteners 36 are attached to flowmeter sensor 16 such that none of the mechanical fasteners 36 extend beyond planar sealing surface 45 at each end of flowmeter sensor 16. Optionally, liner 34 may be heated after being inserted into conduit 32 before flaring liner 32 onto sensor faces 22.

Mechanical fasteners 36 are preferably attached by welding. Welding employing either resistance welding, such as resistance spot welding, or arc welding using a stud welding gun, may be used. Preferably, projection welding is employed where the arc or maximum point of resistance is confined to a small metal piece projecting from the bottom of mechanical fasteners 36. The small projection melts quickly and controllably, creating a consistent weld joint, with relatively little impact on flowmeter sensor 16. Further welding control is achieved by employing a capacitance discharge stud welder using a charged capacitor bank to quickly provide a consistent amount of energy for projection welding.

Alternatively, holes may be drilled into flowmeter sensor 16 and tapped to provide threads by which compatible threaded mechanical fasteners 36 may be attached. However, this is less preferable if attaching to sensor faces 22 as in, for example, the embodiment described above in reference to FIGS. 2A and 2B, because sensor faces 22 are flange-type faces, which may require certification by an independent agency as to their strength. Drilling holes into sensor faces 22 may render certification of the flange connection void. In contrast, welding mechanical fasteners 36 can avoid such alterations and minimize disturbances to the structure of sensor faces 22. This is particularly so if mechanical fasteners 36 are attached by projection welding.

An alternative method of the present invention for preventing shifting of a liner lining a conduit of a magnetic flowmeter employs another example of mechanical fasteners 36, a threaded weld stud with a nut. Unlike the examples of mechanical fasteners 36 described above, threaded weld studs can first be welded into position on flowmeter sensor 16, and then liner 34 can be heated and flared on to sensor face 22 with holes 46 fitting over the threaded weld studs. Then nuts can be threaded on to the threaded weld studs, holding liner 34 in position.

In the present invention, a magnetic flowmeter system includes a magnetic flowmeter sensor where the conduit liner is secured against shifting during the process of handling and installing by extending the liner beyond sealing surfaces on the sensor faces to non-sealing surfaces of the flowmeter sensor. Mechanical fasteners secure the liner to the non-sealing surfaces through holes in the liner. By fastening the liner to the non-sealing surfaces, the mechanical fasteners do not interfere with the effective sealing between the flowmeter sensor and pipe flanges carrying the process fluid. In contrast to the prior art, the present invention does not employ hazardous chemicals and adhesives to secure the liner, nor does the present invention rely on those who handle and install the magnetic flowmeter to correctly follow instructions designed to prevent liner shifting.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic flowmeter sensor for detecting a flow rate of a process fluid flow, the sensor comprising:
   two sensor faces, one on each end of the sensor for connecting the sensor to the process fluid flow;
   a conduit connecting the two sensor faces for conducting the process fluid flow through the sensor;
   a liner lining the conduit for preventing physical contact between the process fluid flow and the conduit; the liner extending the full length of the conduit, and extending across at least a portion of each sensor face at each end of the sensor to form a planar sealing surface at each end of the sensor; the liner on each end including a plurality of holes; and
   a plurality of mechanical fasteners passing through the plurality of holes to mechanically attach the liner on each end of the sensor to the flowmeter sensor to prevent shifting of the liner, wherein the plurality of mechanical fasteners do not extend beyond the planar sealing surface at each end of the sensor.

2. The sensor of claim 1, wherein the liner is a polytetrafluoroethylene liner.

3. The sensor of claim 1, further comprising a plurality of electrodes penetrating the conduit and the liner for measuring a voltage across the process fluid flow, the electrodes in physical contact with the liner such that the plurality of mechanical fasteners prevent shifting of the plurality of electrodes.

4. The sensor of claim 1, wherein:
   the plurality of mechanical fasteners mechanically attach to surfaces not on either of the sensor faces.

5. The sensor of claim 1, wherein the two sensor faces each include:
   a first face portion at a first plane of the sensor face; and
   a second face portion at a second plane of the sensor face, the second face portion including a plurality of bolt holes forming a bolt hole circle;
   wherein the first plane of the sensor face is axially further from a mid-point between the two sensor faces than the second plane of the sensor face; and the plurality of mechanical fasteners mechanically attach to the second face portion at the second plane.

6. The sensor of claim 1, wherein the two sensor faces each further include:
   a first face portion at a first plane of the sensor face, the first face portion including a plurality of bolt holes forming a bolt hole circle; and
   a second face portion at a second plane of the sensor face;
   wherein the first plane of the sensor face is axially further from a mid-point between the two sensor faces than the second plane of the sensor face; and the plurality of mechanical fasteners mechanically attach to second face portion at the second plane.

7. The sensor of claim 1, wherein the plurality of holes in the liner each comprise:
   an outer recess portion adapted to retain a portion of the mechanical fastener such that the mechanical fastener does not extend beyond the planer sealing surface; and
   an inner portion adapted to allow the mechanical fastener to pass through for mechanical connection to a portion of a sensor end face.

8. The sensor of claim 1, wherein the plurality of mechanical fasteners are attached to the flowmeter sensor by at least one of spot welding, projection welding, arc welding, and resistance welding.

9. The sensor of claim 1, wherein the plurality of mechanical fasteners are at least one of a headed weld stud, a shear connector weld stud, and a threaded welded stud and nut combination.

10. The flowmeter sensor of claim 1, wherein the plurality of mechanical fasteners are attached to the flowmeter sensor by a threaded connection.

11. A magnetic flowmeter system for measuring a flow rate of a process fluid flow and transmitting the measured flow rate to a control or monitoring system, the flowmeter system comprising:
    a process transmitter for communicating with the control or monitoring system; and
    a magnetic flowmeter sensor electrically connected to the process transmitter to provide a signal representative of a detected flow rate of the process fluid flow, the magnetic flowmeter sensor comprising:
      two sensor faces, one on each end of the sensor for connecting the sensor to the process fluid flow;
      a conduit connecting the two sensor faces for conducting the process fluid flow through the sensor;
      a liner lining the conduit for preventing physical contact between the process fluid flow and the conduit; the liner extending the full length of the conduit, and extending across at least a portion of each sensor face at each end of the sensor to form a planar sealing surface at each end of the sensor; the liner on each end including a plurality of holes; and
      a plurality of mechanical fasteners passing through the plurality of holes to mechanically attach the liner on each end of the sensor to the flowmeter sensor to prevent shifting of the liner, wherein the plurality of mechanical fasteners do not extend beyond the planar sealing surface at each end of the sensor.

12. The system of claim 11, wherein the liner is a polytetrafluoroethylene liner.

13. The system of claim 11, further comprising a plurality of electrodes penetrating the conduit and the liner for measuring a voltage across the process fluid flow, the electrodes in physical contact with the liner such that the plurality of mechanical fasteners prevent shifting of the plurality of electrodes.

14. The system of claim 11, wherein:
the plurality of mechanical fasteners mechanically attach to surfaces not on either of the sensor faces.

15. The system of claim 11, wherein the two sensor faces each include:
a first face portion at a first plane of the sensor face; and
a second face portion at a second plane of the sensor face, the second face portion including a plurality of bolt holes forming a bolt hole circle;
wherein the first plane of the sensor face is axially further from a mid-point between the two sensor faces than the second plane of the sensor face; and the plurality of mechanical fasteners mechanically attach to the second face portion at the second plane.

16. The system of claim 11, wherein the two sensor faces each further include:
a first face portion at a first plane of the sensor face, the first face portion including a plurality of bolt holes forming a bolt hole circle; and
a second face portion at a second plane of the sensor face;
wherein the first plane of the sensor face is axially further from a mid-point between the two sensor faces than the second plane of the sensor face; and the plurality of mechanical fasteners mechanically attach to second face portion at the second plane.

17. The system of claim 11, wherein the plurality of holes in the liner each comprise:
an outer recess portion adapted to retain a portion of the mechanical fastener such that the mechanical fastener does not extend beyond the planer sealing surface; and
an inner portion adapted to allow the mechanical fastener to pass through for mechanical connection to a portion of a sensor end face.

18. The system of claim 11, wherein the plurality of mechanical fasteners are attached to the flowmeter sensor by at least one of spot welding, projection welding, arc welding, and resistance welding.

19. The system of claim 11, wherein the plurality of mechanical fasteners are at least one of a headed weld stud, a shear connector weld stud, and a threaded welded stud and nut combination.

20. The system of claim 11, wherein the plurality of mechanical fasteners are attached to the flowmeter sensor by a threaded connection.

21. A method for preventing shifting of a liner lining a conduit of a magnetic flowmeter sensor while extending the liner across each of two sensor faces at opposite ends of the flowmeter sensor to create a planar sealing surface at each end of the flowmeter sensor comprises:
inserting the liner into the conduit;
flaring the liner on to the sensor faces of the flowmeter sensor;
inserting a mechanical fastener into each of a plurality of holes in the flared liner; and
attaching each of the inserted mechanical fasteners to the flowmeter sensor such that the plurality of mechanical fasteners do not extend beyond the planar sealing surface at each end of the flowmeter sensor.

22. The method of claim 21, wherein attaching each of the inserted mechanical fasteners includes at least one of spot welding, projection welding, arc welding, and resistance welding the mechanical fasteners to the flowmeter sensor.

23. The method of claim 21, wherein attaching each of the inserted mechanical fasteners includes welding the mechanical fasteners to the flowmeter sensor with at least one of a stud welding gun and a capacitance discharge stud welder.

24. The method of claim 21, wherein attaching each of the inserted mechanical fasteners includes threading the mechanical fastener into the flowmeter sensor.

25. The method of claim 21, further comprising:
heating the inserted liner before flaring the heated liner on to the sensor faces.

* * * * *